Patented June 13, 1950

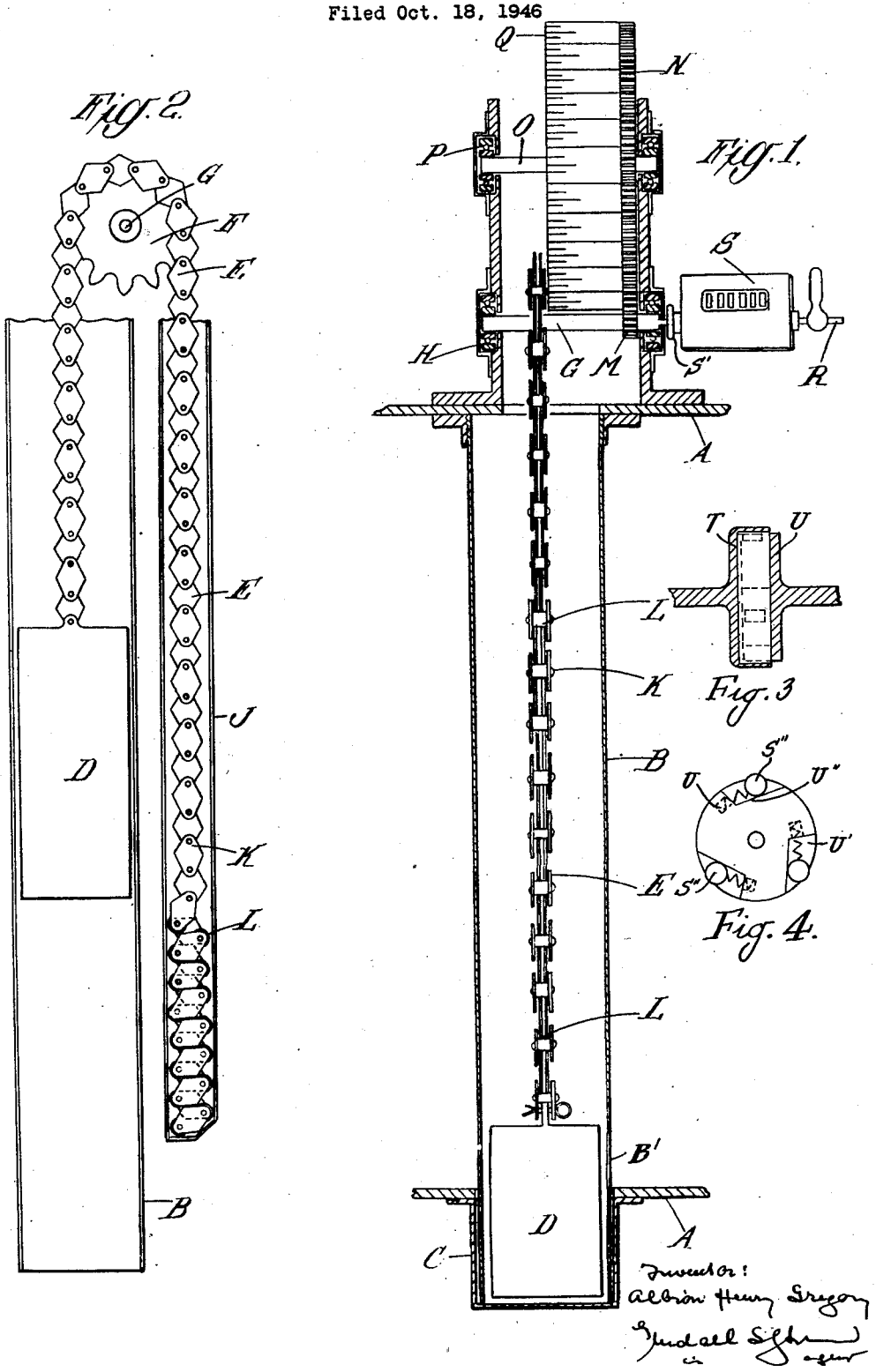

2,511,632

UNITED STATES PATENT OFFICE 2,511,632

MEANS FOR MEASURING THE LEVEL OF LIQUIDS IN TANKS

Albion Henry Gregory, London, England

Application October 18, 1946, Serial No. 704,208
In Great Britain August 23, 1946

5 Claims. (Cl. 73—321)

This invention relates to means of the float type for measuring the level of liquids, more especially for indicating the amount of liquid in a tank or like receptacle at the time being.

According to my invention, the float is supported on a chain which serves both for accurately counterbalancing the float throughout its travel, and also for actuating an indicator or pointer consisting for example of a graduated rotary drum. For this purpose, the chain is made with similar pivoted links of such form, e. g. diamond or rhomboidal, that, assuming the chain to pass over a sprocket or like wheel associated with an indicator and the free end of the chain to rest on a supporting surface, when the float is in its lowermost position, as the float rises due to entrance of liquid into the tank, the links towards the free end of the chain will successively come to rest one on the other in such a manner that the vertical distance between the mid points of the links will be half that which exists when the links are in their fully extended positions. By this means, the unsupported length of chain on the limb opposite that to which the float is attached will always be of such weight that the float will be accurately counterbalanced. The pivotal joints of the links advantageously include rollers which, when the links are in their folded-together positions, rest against the walls of a chain case or guide so that there will be a minimum of frictional resistance to their moving into the extended position when the float descends.

In the accompanying drawing

Figure 1 is a front elevation showing one example, and

Figure 2 a partial side elevation of a similar example or embodiment of my improved level indicating apparatus, the two views showing the floats in different positions.

Figure 3 is a longitudinal section of a one-way clutch connecting the counter to a shaft turned by the float chain, and Figure 4 is a face view of the inner member of such clutch.

A is a tank preferably in the centre of which there is mounted a float tube B having its interior in communication through suitable apertures, such as B', with the interior of the tank A.

The lower extremity of the tube B terminates in an initial flotation sump C which is adapted to trap sufficient liquid to maintain a float D in a condition of buoyancy when the tank is empty, and to ensure that the float will commence to rise when the smallest quantity of liquid is admitted to the empty tank and will continue to float after the last drop has been drawn off from the body of the tank by the normal means, e. g. a petrol delivery pipe.

The float D is suspended in the float tube B by one limb of a chain E which extends over a sprocket wheel F fixed on a shaft G turning in ball bearings H. The other limb of the chain E forms a counterweight which causes the sprocket F to rotate when the float rises or falls due to increase or decrease in the contents of the tank.

That portion of the chain E which is opposed to the float D and which forms the counterweight is contained in a chain case J in the form of a rectangular tube closed at the bottom and sides to prevent ingress of liquid from the body of the tank, but open at the top to allow the chain to enter and hang down within it.

Sufficient chain E is employed to ensure that when the tank is empty and the float is only supported by the liquid which is contained in the initial flotation sump C, the part of the chain which is acting as a counterweight is just clear of the bottom of the chain casing. In this way, the only part of the chain which is effective as a counterweight comprises the links which are exactly opposite the float. All the remainder of the chain is balanced by a similar number of links on the other side of the sprocket.

The links E of the chain are made as shown of diamond or rhomboidal form, the sides being of such dimensions and at such angles relatively to one another that when the links rest one on another, the vertical distance between the mid points of the links is one half of that which exists between them when the chain is in its extended position, i. e. it is equal to half the pitch of the chain. The pivot pins K of the links are provided with rollers L for engaging the walls of the chain case G during the folding and unfolding of the links.

The shaft G is provided with a pinion M meshing with a gear wheel N on a shaft O running in ball bearings P and having fixed thereto a drum Q graduated e. g. in accordance with the capacity of the tank, the periphery of this drum moving past a fixed datum line to enable the amount of liquid in the tank to be indicated.

The shaft G is also connected to the spindle R of a counter S through a one-way clutch S', e. g. of the known free-wheel type comprising balls S'' enclosed in a casing T forming one member of the clutch and running freely in recesses U' in the other member U of the clutch in one direction of rotation of the shaft G, and being held between the peripheral wall of the casing T and inclines U" in the recesses U in the other direction of rotation of the shaft G in order to indicate either the amount of liquid introduced into the tank A or the amount of liquid drawn off therefrom over a given period.

The weight of the float D is greater than that of the effective counterweight, so that when the level of liquid in the tank falls the float will overcome the counterweight and as the float falls and the links of the chain pass over the sprocket, the folded links unfold and balance is maintained.

When liquid is admitted to the tank, the float D begins to rise, and the effective portion of the chain counterweight pulling the sprocket F around causes some chain links to be transferred from the float side of the sprocket to the other side thereof. When this occurs the bottom link E on the counterweight side will touch the bottom of the chain case J, and will fold to exactly one half of the pitch of the chain. The weight of this link will then be supported by the bottom of the chain case, and will be subtracted from the total weight of the counter. In this manner, as each link is transferred from the float side of the sprocket to the counterweight side thereof, another link in the effective counterweight folds to compensate it.

As each pair of links folds to the exact length of one pitch of the chain, the counterweight rises at exactly the same rate as the float and an accurate balance is maintained.

As each link folds, the link next above it is carried over to one side of the chain case, and the widest part of the link comes into contact with the wall of the chain case, which pushes the link off balance so that its own weight and the downward thrust of the link next above it will cause it to fold. As each link tips over, the roller L touches the side of the chain case so relieving the edges of the links from frictional contact with the chain case at the moment of folding. The dimensions of the links and the angularity of their sides being such that when folded, each link bears on the one next below, there is prevented pressure by the rollers on the sides of the chain case, which might cause the chain to bind in the case, and so impede its unfolding. This feature also ensures that the chain when folded is exactly one half its overall length when unfolded.

By this means, the liquid contents of bulk storage tanks and road or rail tank wagons for petrol or other liquid can be automatically indicated, the apparatus being sufficiently sensitive to indicate the slightest variation in the level of the liquid contained in the tank. It is moreover of such robust design and construction that it will maintain its accuracy over long periods with a minimum of attention.

In the apparatus above described, it has been assumed that the amount of liquid contained in the tank at any time is directly proportional to the height of the liquid therein, i. e. that the tank has vertical lateral walls and a horizontal bottom. In other cases, e. g. where a cylindrical tank arranged with its axis horizontal is employed the following means may be adopted, viz. the drum Q is geared to the sprocket wheel shaft at such a velocity-ratio that it makes one revolution during the full travel of the float and is graduated in accordance with the capacities at different heights of the level of liquid.

I claim:

1. A liquid measuring apparatus for tanks, comprising a pulley rotatably mounted on said tank, indicating means operatively connected to said pulley, a float, a vertically extending guide, a supporting surface beneath said guide, a chain extending over said pulley and having one limb connected to said float, the other limb of said chain forming a counterbalance to the first mentioned limb of the chain and extending into said guide and resting on said supporting surface, the links of the chain being of similar weight and so shaped that when resting one on another the vertical distance between their mid points is half that which exists when they are in their extended positions.

2. A liquid measuring apparatus as claimed in claim 1, the chain of which comprises links of rhomboidal form.

3. A liquid measuring apparatus as claimed in claim 1, the guide for the counterbalance limb of the chain consisting of a tubular case, the walls of which serve to guide the links of the chain in their up and down movement.

4. A liquid measuring apparatus as claimed in claim 1, comprising a guide tube for the float, said guide tube being in communication with the interior of the tank, and an initial flotation sump in the tank at the bottom of said guide tube.

5. A liquid measuring apparatus for tanks, comprising a pulley rotatably mounted in said tank, a float, guide means having vertically extending guide surfaces, supporting means having a supporting surface beneath said guide surfaces, a chain extending over said pulley and having one limb connected to said float, the other limb of said chain forming a counterbalance to the first mentioned limb of the chain and extending between said guide surfaces of said guide means and resting on said supporting surface of said supporting means, the links of the chain being of similar weight and so shaped that when resting one on another the vertical distance between the said points of the links is half that which exists when the links are in their extended positions, and indicating means associated with the unit formed by the float and the chain.

ALBION HENRY GREGORY.

REFERENCES CITED

The following references are of record in the file of this patent:

UNITED STATES PATENTS

| Number | Name | Date |
| --- | --- | --- |
| 467,996 | Pringle | Feb. 2, 1892 |
| 1,412,429 | Van Derbeck | Apr. 11, 1922 |
| 1,570,481 | Grain et al. | Jan. 19, 1926 |
| 1,656,705 | Gould | Jan. 17, 1928 |
| 2,110,490 | Renner | Mar. 8, 1938 |

FOREIGN PATENTS

| Number | Country | Date |
| --- | --- | --- |
| 762,451 | France | Jan. 22, 1934 |